Patented Feb. 8, 1938

2,107,656

UNITED STATES PATENT OFFICE 2,107,656

DYESTUFFS OF THE DIBENZANTHRONE SERIES

Alexander J. Wuertz, Carrollville, and Ralph N. Lulek, Waukesha, Wis., assignors to E. I. du Pont de Nemours & Company, Wilmington, Del., a corporation of Delaware No Drawing. Application October 19, 1936, Serial No. 106,366

2 Claims. (Cl. 260—61)

This invention relates to the preparation of new dyestuffs of the dibenzanthrone series.

We have found that new and valuable gray and black vat dyestuffs of the dibenzanthrone series can be prepared by reacting aminodibenzanthrones with perchloromethylmercaptan. These dyestuffs have the excellent fastness properties characteristic of this class of compounds, with the added advantage that they dye directly in red-black shades as compared to the known aminodibenzanthrones of commerce which must be developed on the fiber. These new compounds have also been found to have good printing properties since they build up well, and they are therefore a valuable addition to the field of dibenzanthrone colors.

According to our invention aminodibenzanthrones are reacted with perchloromethylmercaptan in an organic solvent at temperatures of frome 120° C. to the boiling point of the solvent employed. The exact chemical structure of these new compounds is not known, although they are believed to include a thiourea linkage.

Any aminodibenzanthrone containing one or more amino groups may be employed; the shade of the ultimate dyestuff varying to some extent depending on the particular aminodibenzanthrone used.

The following examples are given to illustrate our invention. The parts used are by weight.

Example 1

10 parts aminodibenzanthrone (obtained by nitrating dibenzanthrone in ortho-dichlorobenzene with strong nitric acid followed by reduction with aluminum in sulfuric acid or with sodium sulfide in aqueous medium) are heated in 100 parts nitrobenzene to 135–140° C. At this temperature 10 parts perchloromethylmercaptan are added slowly. The temperature is then raised gradually to the boil and maintained for 1 hour. After cooling, the new dyestuff is separated by filtration, washed and dried. It is a dark powder and may be purified by dissolving in sulfuric acid (in which it is soluble with violet color) and heating to 60–70° C. for a short time. From this solution it is precipitated in blue-black flocks which are filtered off, washed free from acid and dried.

The new dyestuff dyes and prints in reddish gray to black shades from a blue vat.

Example 2

10 parts aminodibenzanthrone (obtained by nitrating dibenzanthrone in sulfuric acid followed by reduction with alkali sulfide) are heated in 100 parts of nitrobenzene to 140° C. 10 parts perchloromethylmercaptan are added and the mass is heated to the boil for 1 hour. The dyestuff is separated as in the foregoing example and has similar properties.

These new gray and black dyestuffs may be employed as vat dyestuffs for dyeing or printing or they may be converted to "leuco esters" by methods employed for the solubilization of dibenzanthrone dyestuffs and used for dyeing fiber in that form.

In the claims it should be understood that where new compounds are claimed, we mean to include such compounds not only in substance, but also in whatever state they may exist when applied to material, dyed, printed or pigmented therewith.

We claim:

1. The products obtainable by reacting a primary aminodibenzanthrone which contains no additional substituents with perchloromethylmercaptan, which are soluble in sulfuric acid with a violet color, and which dye cotton in gray to black shades from blue vats.

2. In the process for preparing new gray to black vat dyestuffs of the dibenzanthrone series, the step which comprises heating a primary aminodibenzanthrone which contains no additional substituents with perchloromethylmercaptan in an inert organic solvent, at temperatures above about 120° C.

ALEXANDER J. WUERTZ.
RALPH N. LULEK.